(12) United States Patent
Dauner et al.

(10) Patent No.: US 12,549,058 B2
(45) Date of Patent: Feb. 10, 2026

(54) ROTARY ELECTRIC MACHINE AND OIL RING FOR ROTARY ELECTRIC MACHINE

(71) Applicant: WEG EQUIPAMENTOS ELÉTRICOS S.A., Jaraguá do Sul (BR)

(72) Inventors: Fernando Andre Lindroth Dauner, Jaraguá do Sul (BR); Samuel Santos Borges, Jaraguá do Sul (BR); Douglas Eyng Fritzen, Jaraguá do Sul (BR); Cassiano Antunes Cezario, Jaraguá do Sul (BR)

(73) Assignee: WEG EQUIPAMENTOS ELÉTRICOS S.A., Jaragua Do Sul (BR)

( * ) Notice: Subject to any disclaimer, the term of this patent is extended or adjusted under 35 U.S.C. 154(b) by 255 days.

(21) Appl. No.: 18/258,113

(22) PCT Filed: Dec. 23, 2020

(86) PCT No.: PCT/BR2020/050582
§ 371 (c)(1),
(2) Date: Jun. 16, 2023

(87) PCT Pub. No.: WO2022/133556
PCT Pub. Date: Jun. 30, 2022

(65) Prior Publication Data
US 2024/0039360 A1    Feb. 1, 2024

(51) Int. Cl.
*F16C 19/26* (2006.01)
*F16C 33/66* (2006.01)
*H02K 5/173* (2006.01)

(52) U.S. Cl.
CPC ............ *H02K 5/173* (2013.01); *F16C 19/26* (2013.01); *F16C 2380/26* (2013.01)

(58) Field of Classification Search
CPC ............ H02K 5/00; H02K 5/173; F01M 9/00; F01M 9/06; F16N 7/22; F16N 7/00;
(Continued)

(56) References Cited

U.S. PATENT DOCUMENTS 1,313,736 A * 8/1919 Rice .................... F16N 7/22
                                                          384/406
4,565,937 A * 1/1986 Uhen .................. H02K 7/085
                                                          310/90

(Continued)

OTHER PUBLICATIONS

International Search Report and Written Opinion of the International Searching Authority for PCT.BR2020/050582 dated Sep. 22, 2021.

*Primary Examiner* — Tran N Nguyen
(74) *Attorney, Agent, or Firm* — B. Aaron Schulman, Esq.; Stites & Harbison, PLLC

(57) ABSTRACT

A rotary electric machine is provided that includes a housing that forms an internal cavity that houses a rotor/stator assembly, in which the rotor is positioned on a main shaft of the machine, a lubricating fluid reservoir defining a hub portion defining an inner surface, and at least one roller bearing coupled to the main shaft and supported by the hub portion and by a bushing. The machine includes an oil ring fastened to the bushing and arranged between the main shaft of the machine and the inner surface of the hub portion, wherein the oil ring includes a wall having a substantially circular cross section and at least one elongate and inclined projection on an outer surface of the wall, each elongate and inclined projection having a lower edge and an upper edge and in which the rotation of the oil ring generates a pressure difference between the lower edge and the upper edge to force the lubricant towards the at least one roller bearing.

9 Claims, 4 Drawing Sheets

(58) Field of Classification Search
CPC ........ F16N 7/18; F16C 19/26; F16C 33/6666; F16C 19/36; F16C 19/364; B65G 45/08; F16H 57/05
See application file for complete search history.

(56) References Cited

U.S. PATENT DOCUMENTS 4,964,489 A    10/1990  Patel
2014/0262623 A1    9/2014  Garlapati et al.

\* cited by examiner

ROTARY ELECTRIC MACHINE AND OIL RING FOR ROTARY ELECTRIC MACHINE

FIELD OF THE INVENTION

The present invention relates to a rotary electrical machine and, more specifically, to a rotary electrical machine having an oil ring to increase the flow of lubricant directed to the roller bearing of a rotary electrical machine and, consequently, generate a reduction in bearing temperature.

BACKGROUND OF THE INVENTION

Rotary electrical machines are widely known in the art, and basically comprise a static part (stator) and a rotary part (rotor). They can comprise both electric motors and electric generators.

As known by those skilled in the art, rotary machines comprise a shaft partially housed in a housing that defines a cavity where the rotor/stator assembly is installed, and the interface between the shaft and the static components is carried out by roller bearings.

To prevent failures and extend their service life, roller bearings are generally lubricated with oil or grease. Thus, some rotary electrical machines comprise a reservoir of oil or other lubricating fluid in which the roller bearing is arranged, which is constantly lubricated during machine operation. The correct lubrication of the roller bearing prevents an excessive increase in its temperature.

OBJECTIVES OF THE INVENTION

It is an objective of the present invention to provide a technical solution capable of preventing failures related to inadequate lubrication of at least one roller bearing of the rotary electrical machine.

It is another objective of the present invention to provide a technical solution capable of increasing the lubricant flow passing through the roller bearing during machine operation.

It is another objective of the present invention to provide a rotary electric machine with an oil ring capable of increasing the lubricant flow passing through the roller bearing during machine operation.

BRIEF DESCRIPTION OF THE INVENTION

The present invention relates to a rotating electrical machine of the type comprising a housing that delimits an internal cavity that houses a rotor/stator assembly, the rotor being arranged on a main shaft of the machine, a lubricating fluid reservoir defining a hub portion with an inner surface, and at least one roller bearing coupled to the main shaft and supported by the hub portion and by a bushing, the machine comprising an oil ring to increase the flow of oil passing through the roller bearing.

The oil ring is fixed to the bushing and arranged between the main shaft of the machine and the inner surface of the hub part. In the preferred embodiment of the invention, the oil ring comprises a wall of substantially circular cross-section and at least one elongated, inclined projection on an outer surface of the wall. Each elongated, inclined projection has a lower edge and an upper edge, the rotation of the oil ring generating a pressure difference between the lower edge and the upper edge to force the lubricant towards at least one roller bearing.

The elongated and inclined projection can be, for example, selected among helical projection, straight inclined projection or curved inclined projection.

In one embodiment of the invention, the oil ring has an upper edge that is preferably fixed by interference in a recess formed in the bushing. In other embodiments, the ring is fixed by alternative means, such as a keyway, splines or screws, among others.

The machine according to the present invention may further comprise a sealing cup between the shaft and a lower portion of the hub part. In one embodiment of the invention, the oil ring comprises five spaced apart elongated and inclined projections. In other embodiments of the invention, the number and shape of the projections can be different.

BRIEF DESCRIPTION OF THE DRAWINGS

The present invention will be described below in more detail, with reference to the attached drawings, in which.

DETAILED DESCRIPTION OF THE INVENTION

Figure 1:
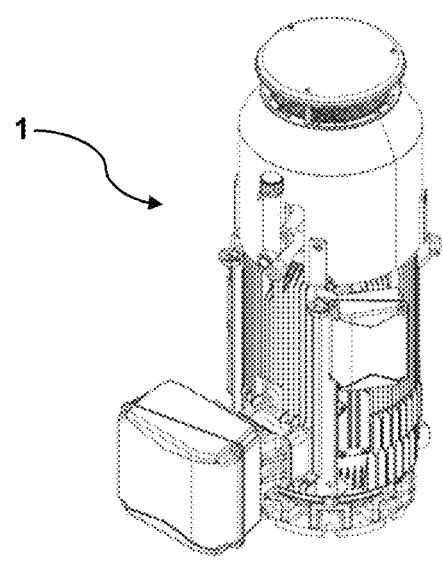
FIG. 1 is a perspective view of a rotary electric machine according to an embodiment of the present invention.

FIG. 1 shows a perspective view of an electric motor comprising an oil ring according to an embodiment of the present invention.

Although the present invention is described in the context of an electric motor, it should be understood that the solution of the present invention could also be applied to other electrical machines that comprise a lubricating fluid reservoir, such as, for example, any rotary electrical machine with such resources.

Figure 2:
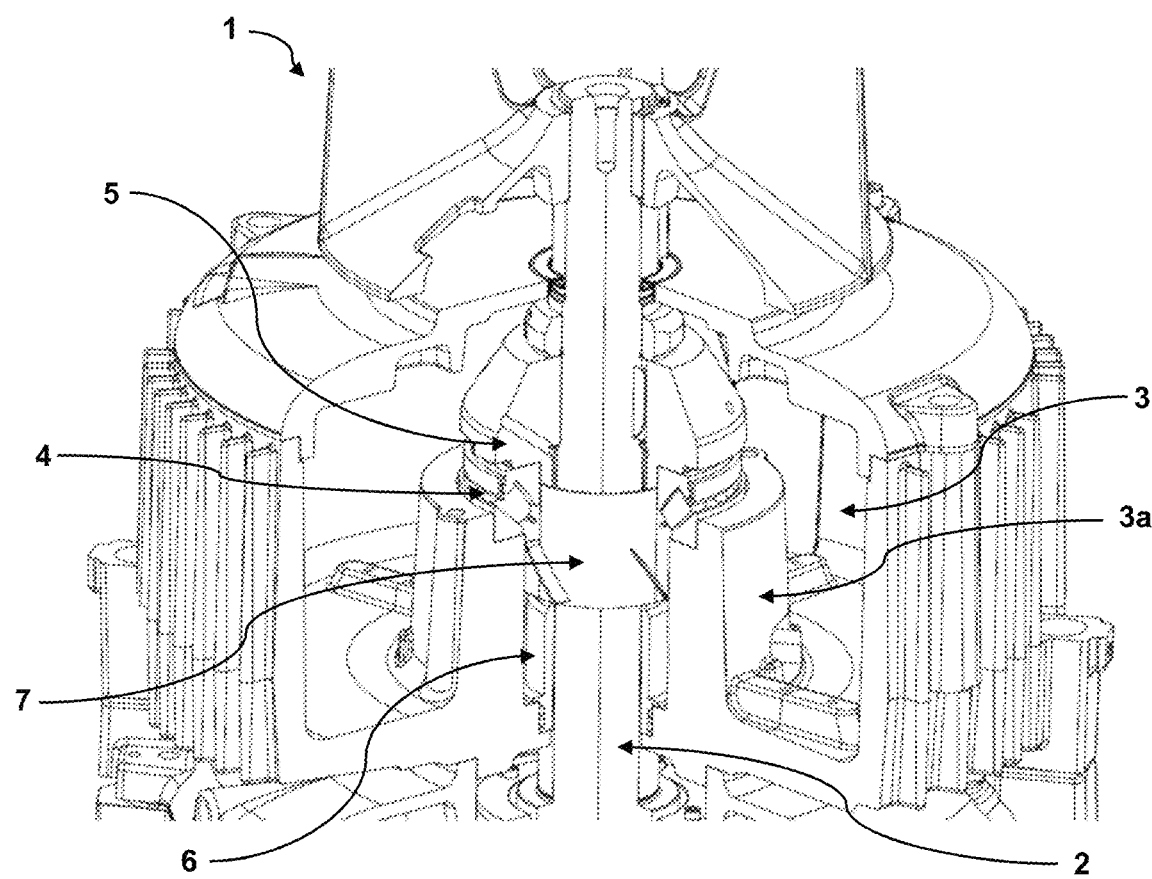
FIG. 2 is a partial sectional view of a rotary electric machine according to an embodiment of the present invention, showing the lubricating fluid reservoir region of the machine.

FIG. 2 shows a partial illustration, with a sectional view, of the electric motor comprising an oil ring according to an embodiment of the present invention, showing the region where the engine lubricating fluid reservoir is arranged.

As can be seen in FIG. 2, the electric motor 1 comprises a housing where a main shaft 2 of the machine is partially housed. The housing defines a cavity in which the rotor/stator assembly of the machine is housed. As known by those skilled in the art, the assembly is formed by a stator and a rotor, concentric to the stator, and the rotor is arranged on the main shaft.

The machine also comprises a lubricating fluid reservoir 3 that defines an internal volume for receiving the lubricant, for example, oil. At least one roller bearing 4 is provided internally to the lubricating fluid reservoir 3, so that the at least one roller bearing 4 is partially submerged in the lubricant present inside the reservoir.

In the embodiment illustrated in the figure, the reservoir comprises a hub part 3a, in which the roller bearing is partially supported and in which the shaft 2 is supported by means of a bushing 5. A sealing cup 6 is provided between the shaft 2 and the lower portion of the hub part 3a.

An oil ring 7 is provided internally to the hub part 3a. In one embodiment of the invention, best illustrated in FIGS. 6 and 6a, the oil ring 7 is fixed to the bushing 5. Thus, in one embodiment of the invention, best illustrated in FIGS. 3 to 6a, the inner surface 7b of the upper edge of the oil ring 7 interference fits into a corresponding recess 5a on the lower edge of bushing 5.

Figure 3:
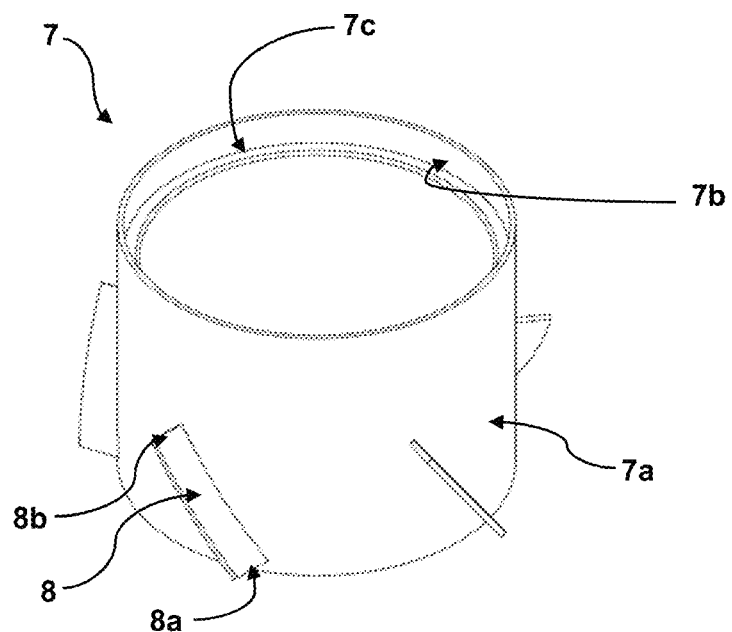
FIG. 3 is a perspective view of an oil ring according to an embodiment of the present invention.
Figure 4:
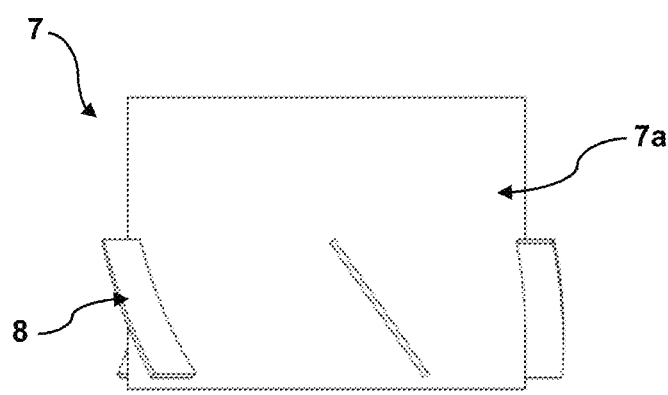
FIG. 4 is a front view of an oil ring according to an embodiment of the present invention.
Figure 5:
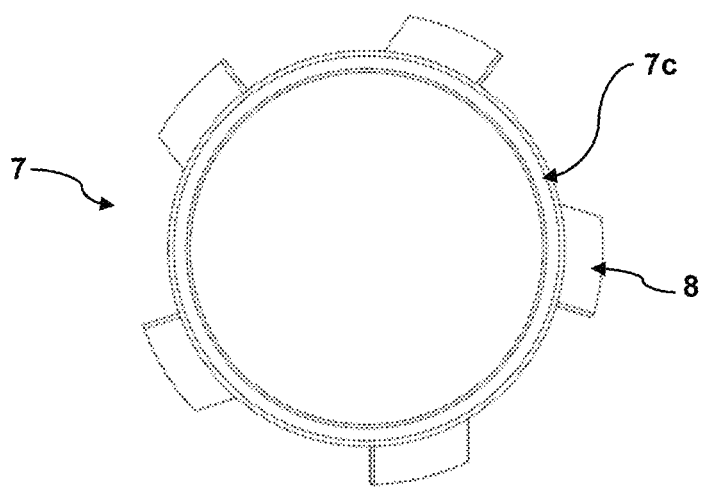
FIG. 5 is a top view of an oil ring according to an embodiment of the present invention.
Figures 6, 6A:
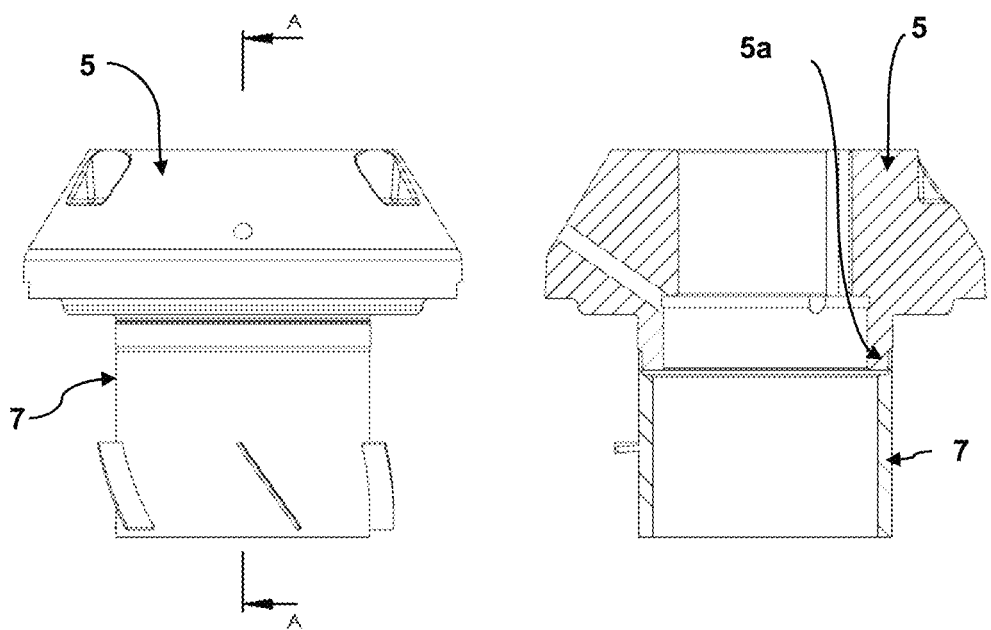
FIG. 6 is a front view showing the assembly of the oil ring according to an embodiment of the present invention in an electrical machine bushing and FIG. 6a is a view of the AA section shown in FIG. 6.
Figure 7:
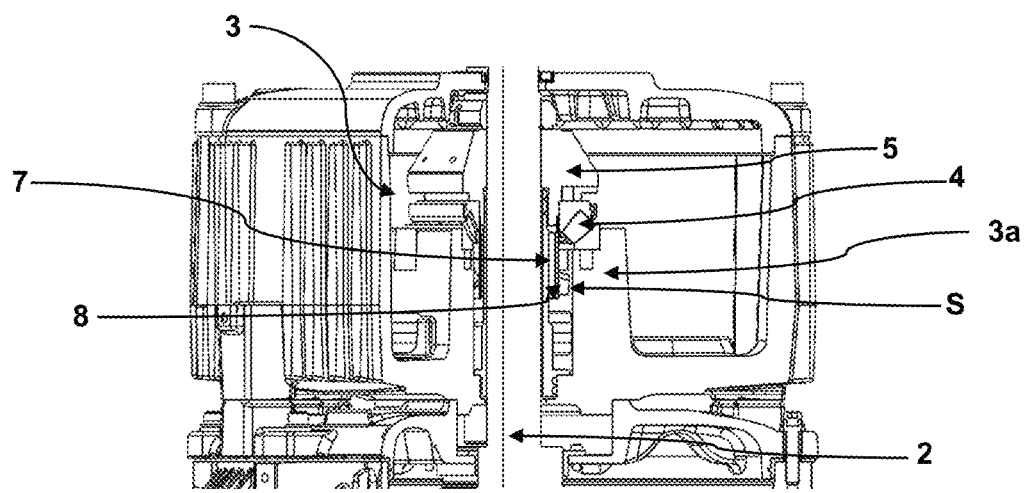
FIG. 7 is a partial sectional view of the lubricating fluid reservoir region of the rotary electric machine according to an embodiment of the present invention.

In this sense, as best illustrated in FIGS. 3 and 5, the inner surface 7b of the upper edge of the ring 7 can comprise a stop wall 7c for the lower edge of the bushing 5.

FIG. 3 shows a preferred embodiment of the oil ring 7. As can be seen in that figure, the ring 7 comprises a wall of substantially circular cross-section, such as a cylindrical or conical wall, and on whose outer surface at least one projection is provided elongated and inclined 8. In a preferred embodiment of the invention, the oil ring 7 comprises five spaced apart elongated and inclined projections 8. In other embodiments of the invention, the number and shape of the projections can be different.

Thus, with the rotation of the oil ring 7 and due to the inclination of the projections 8, a pressure difference is generated between the lower edge 8a and the upper edge 8b of each projection 8, creating a "pumping effect" which forces the lubricant upwards towards the tracks of at least one roller bearing 4.

In the embodiment shown in the figures, the ring 7 has five elongated and inclined projections 8 spaced apart, but the number of projections can be different.

Furthermore, in the preferred embodiment shown in the figures, the elongated and inclined projections 8 have a helical shape, but other shapes can be used, such as, for example, that of elongated, inclined projections, straight or curved.

The oil ring 7 is dimensioned so that there is a spacing between the most radially outer edge of the projections 8 on the cylindrical wall of the ring 7 and the inner surface of the hub portion 3a of the lubricating fluid reservoir 3.

This spacing must be dimensioned such that it is small enough to generate the pressure difference between the lower 8a and upper 8b edges of the projection 8 to allow the aforementioned pumping effect, but at the same time to avoid mechanical drag between the components, which would generate heat and heat up the lubricant, impairing its correct functioning.

In one embodiment, this spacing is 0.1 to 1.5% of the diameter of the cylindrical wall 7a of the oil ring 7 (see FIG. 2).

Although examples of embodiments of the present invention have been described, it should be understood that the scope of the present invention covers other possible variations of the described inventive concept, being limited only by the content of the claims only, including the possible equivalents.

The invention claimed is:

1. A rotary electric machine comprising a housing delimiting an internal cavity that houses a rotor and stator assembly, with the rotor arranged on a main shaft of the machine, a lubricating fluid reservoir with a hub part defining a radial inner face with respect to the main shaft of the machine, and at least one roller bearing coupled to the main shaft of the rotary electric machine and supported by the hub part and by a bushing, comprising an oil ring fixed to the bushing and arranged between the main shaft of the rotary electric machine and the radial inner face of the hub part, wherein the oil ring comprises a wall of substantially circular and at least one elongated and inclined projection on an outer surface of the wall, the at least one elongated and inclined projection having a lower edge and an upper edge and wherein a rotation of the oil ring generates a pressure difference between the lower edge and the upper edge to force the lubricant towards the at least one roller bearing.

2. The machine, according to claim 1, wherein the at least one elongated and inclined projection is a helical projection.

3. The machine, according to claim 1, wherein the at least one elongated and inclined projection is a straight inclined projection.

4. The machine, according to claim 1, wherein the at least one elongated and inclined projection is a curved inclined projection.

5. The machine, according claim 1, wherein the oil ring has an upper edge that is fixed by interference in a recess formed in the bushing.

6. The machine according to claim 1, further comprising a sealing cup between the shaft and a lower portion of the hub part.

7. The machine according claim 1, wherein the oil ring comprises at least two elongated and inclined projections.

8. The machine according to claim 1, wherein the oil ring is dimensioned so that there is a spacing between the at least one projection and the radial inner face of the hub part of the lubricating fluid reservoir wherein the spacing is 0.1 to 1.5% of a diameter of the wall of the oil ring.

9. An oil ring for a rotary electrical machine comprising a housing delimiting an internal cavity that houses a rotor and stator assembly, the rotor being arranged on a main shaft of the machine, a lubricating fluid reservoir defining a hub part with a radial inner surface with respect to the main shaft of the machine, and at least one roller bearing coupled to the main shaft and supported by the hub part and by a bushing, the oil ring comprising a wall of substantially circular cross-section and at least one elongated and inclined projection on an outer surface of the wall, wherein the oil ring is dimensioned to be arranged between the main shaft of the machine and the radial inner surface of the hub part, and further comprising five elongated and inclined projections spaced apart.

* * * * *